United States Patent [19]
Matsuoka

[11] Patent Number: 5,881,556
[45] Date of Patent: Mar. 16, 1999

[54] STATOR AND STATOR SUPPORT STRUCTURE FOR TORQUE CONVERTOR

[75] Inventor: Yoshihiro Matsuoka, Osaka, Japan

[73] Assignee: Exedy Corporation, Neyagawa, Japan

[21] Appl. No.: 880,429

[22] Filed: Jun. 23, 1997

[30] Foreign Application Priority Data

Jul. 10, 1996 [JP] Japan .................................. 8-180935

[51] Int. Cl.[6] ................................................. F16D 33/00
[52] U.S. Cl. ............................................. 60/339; 60/345
[58] Field of Search .......................... 60/330, 339, 345, 60/336

[56] References Cited

U.S. PATENT DOCUMENTS

| | | | |
|---|---|---|---|
| 2,737,423 | 3/1956 | Zeidler | 60/339 X |
| 4,953,353 | 9/1990 | Lederman | 60/345 |
| 5,655,875 | 8/1997 | Sekine | 60/345 X |
| 5,676,230 | 10/1997 | Awaji et al. | 60/339 X |
| 5,680,758 | 10/1997 | Miura | 60/345 |

*Primary Examiner*—Hoang Nguyen
*Attorney, Agent, or Firm*—Shinjyu An Intellectual Property Firm Osaka, Japan

[57] ABSTRACT

To provide a stator in which a stator and an impeller or a turbine are brought into direct contact with each other to thereby dispense with a thrust bearing, and in which a frictional wear in the contact portion is suppressed to a small extent to thereby prolong a service life of a torque convertor, a stator 7 is provided with a thrust receiving portion 7c for a torque convertor with an impeller and a turbine facing each other. The thrust receiving portion 7c is provided in an inner circumferential portion of the stator, and brought into contact with the impeller so that an axial movement of the thrust receiving portion 7c is limited. Oil grooves 7d for recirculating and holding working oil are formed in a contact surface of the thrust receiving portion 7c.

20 Claims, 10 Drawing Sheets

STATOR AND STATOR SUPPORT STRUCTURE FOR TORQUE CONVERTOR

BACKGROUND OF THE INVENTION

1. Field of the Invention

The present invention relates to a stator and stator support structure for a torque convertor.

2. Description of the Related Art

A torque convertor includes a front cover and an impeller shell, which together define a fluid chamber. Within the fluid chamber, the torque convertor includes an impeller, a turbine and a stator. Torque is transmitted via a working fluid from rotation of the impeller to the turbine. The stator is interposed between a radial inward portion of the impeller and the turbine. The stator is fixed to a one-way clutch which is in turn fixed to a stator shaft. The stator shaft is fixed to a transmission housing. The one-way clutch is composed of an outer race fixed to a stator carrier, an inner race fixed to the stator shaft and a plurality of clutch members interposed between the two races.

Annular retainers are disposed on each axial side of the two races of the one-way clutch. The retainers limit the axial movement of the one-way clutch. Furthermore, the one-way clutch includes thrust roller bearings that limit axial movement of the retainer and the one-way clutch. There may be one thrust bearing at either axial end of the one-way clutch. One side surface of the thrust roller bearing is in contact with one surface of the retainer, and the other side surface is supported on the hub of the turbine or the hub of the impeller. Oil grooves extending radially are formed on the side surface of the retainers contacting with the thrust roller bearings serve to recirculate working oil.

As described above, in the conventional torque convertor, the thrust roller bearing is interposed between the one-way clutch and either the impeller or the turbine for supporting the above described portions of the one-way clutch to limit the relative movement between these components in the axial direction. The thrust roller bearings are provided at two positions between the one-way clutch and the impeller and between the one-way clutch and the turbine.

These bearings are needed for maintaining the position of the stator with respect to the impeller and the turbine for relative rotation with respect to each other. The retainer and roller bearings are costly and take up a significant amount of axial space within the torque convertor. Therefore, if it is possible to reduce the size of these members or dispensed with any of them, it may be possible to reduce the cost and weight of the torque convertor and to shorten an axial dimension thereof.

In order to dispense with the bearings, it may be proposed to bring the stator and the impeller or the turbine into direct contact with each other. However, if the bearings are simply dispensed with from the conventional structure, the contact portion between the stator and the impeller or the turbine causes wear of the components, resulting in the reduction in service life of the torque convertor.

SUMMARY OF THE INVENTION

An object of the present invention is to provide a stator with thrust support without using a thrust bearing on at least one axial end, thereby facilitating reduction of an axial dimensions of a torque convertor.

In accordance with one aspect of the present invention, a torque convertor includes a stator body interposed between an impeller and a turbine. The stator body is formed with a thrust receiving portion provided on an inner circumferential portion of the stator body, the thrust receiving portion having a contact surface configured for direct contact with a portion of either the impeller or the turbine such that axial movement of the stator body is limited by the thrust receiving portion. The thrust receiving portion includes a plurality of oil grooves formed in the contact surface, the oil grooves for recirculating and retaining working oil.

Preferably, the contact surface extends in a radial direction, the oil grooves include first groove portions extending radially from an inner circumferential edge of the contact surface, second groove portions extending in a circumferential direction in the contact surface, and third groove portions extending radially outwardly from the second groove portions toward an outer circumferential edge of the contact surface.

Preferably, the first groove portions are circumferentially offset from the third groove portions.

Preferably, first ends of the second groove portions include oil reservoir portions.

Preferably, the stator body is formed with a one-way clutch receiving portion on an inner circumferential side, the one-way clutch receiving portion for receiving a one-way clutch, and the thrust receiving portion limits an axial movement of the one-way clutch.

Preferably, the thrust receiving portion is formed with holes for communication between the one-way clutch receiving portion and the contact surface.

In accordance with another aspect of the present invention, a torque convertor includes a stator body interposed between an impeller and a turbine in a torque convertor. The stator body is formed with a thrust receiving portion provided on an inner circumferential portion of the stator body. The thrust receiving portion has a contact surface configured for direct contact with a portion of the impeller such that axial movement of the stator body is limited by the thrust receiving portion. The thrust receiving portion includes a plurality of oil grooves formed in the contact surface, the oil grooves for recirculating and retaining working oil.

Preferably, the contact surface extends in a radial direction, the oil grooves include first groove portions extending radially from an inner circumferential edge of the contact surface, second groove portions extending in a circumferential direction in the contact surface, and third groove portions extending radially outwardly from the second groove portions toward an outer circumferential edge of the contact surface.

Preferably, the first groove portions are circumferentially offset from the third groove portions.

Preferably, first ends of the second groove portions include oil reservoir portions.

Preferably, the stator body is formed with a one-way clutch receiving portion on an inner circumferential side, the one-way clutch receiving portion for receiving a one-way clutch, and the thrust receiving portion limits an axial movement of the one-way clutch.

Preferably, the thrust receiving portion is formed with holes for communication between the one-way clutch receiving portion and the contact surface.

In accordance with another aspect of the present invention, a torque convertor includes a stator body interposed between an impeller and a turbine in a torque convertor. The stator body is formed with a thrust receiving portion provided on an inner circumferential portion of the stator body. The thrust receiving portion has a contact surface configured for direct contact with a portion of the turbine such that axial movement of the stator body is limited by the thrust receiving portion, The thrust receiving portion includes a plurality of oil grooves formed in the contact surface, the oil grooves for recirculating and retaining working oil.

Preferably, the contact surface extends in a radial direction, the oil grooves include first groove portions extending radially from an inner circumferential edge of the contact surface, second groove portions extending in a circumferential direction in the contact surface, and third groove portions extending radially outwardly from the second groove portions toward an outer circumferential edge of the contact surface.

Preferably, the first groove portions are circumferentially offset from the third groove portions.

Preferably, first ends of the second groove portions include oil reservoir portions.

Preferably, the stator body is formed with a one-way clutch receiving portion on an inner circumferential side, the one-way clutch receiving portion for receiving a one-way clutch, and the thrust receiving portion limits an axial movement of the one-way clutch.

Preferably, the thrust receiving portion is formed with holes for communication between the one-way clutch receiving portion and the contact surface.

In accordance with still another aspect of the present invention, a torque convertor includes a stator body interposed between an impeller and a turbine in a torque convertor. The stator body formed with first and second thrust receiving portions provided on opposing axial ends of an inner circumferential portion of the stator body. The first and second thrust receiving portions each have a corresponding contact surface configured for direct contact with a portion of the impeller and the turbine, respectively, such that axial movement of the stator body is limited by the first and second thrust receiving portions. The first and second thrust receiving portions each include a plurality of oil grooves formed in the contact surface, the oil grooves for recirculating and retaining working oil.

Preferably, each of the contact surfaces extends in a radial direction, the oil grooves include first groove portions extending radially from an inner circumferential edge of the contact surface, second groove portions extending in a circumferential direction in the contact surface, and third groove portions extending radially outwardly from the second groove portions toward an outer circumferential edge of the contact surface.

During the operation of the torque convertor, the stator is rotated relative to the impeller and turbine under the condition that the thrust receiving portion is in contact with either the impeller or the turbine. In this case, a frictional resistance generated between the contact surfaces is minimized since the oil grooves are provided for maintaining the working oil on and about the contact surface. Hence, an amount of wear due to friction reduced to a degree where such wear has little or no affect on the service life of the torque convertor.

DESCRIPTION OF THE PREFERRED EMBODIMENTS

The present invention will now be described by way of various embodiments with reference to the accompanying drawings.

FIRST EMBODIMENT

Figure 1:
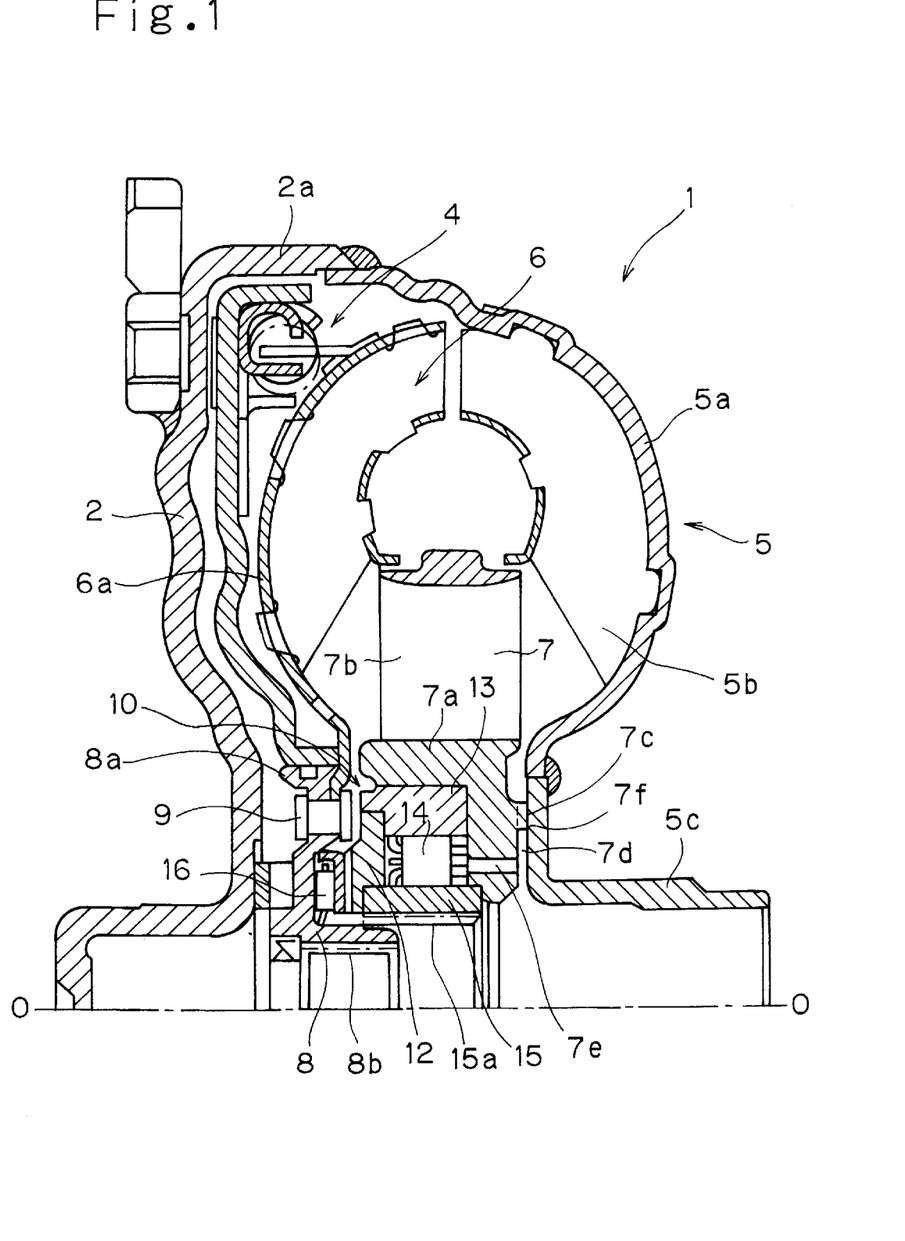
FIG. 1 is a fragmentary, cross-sectional view showing a portion of a torque convertor in accordance with one embodiment of the invention.
Figure 2:
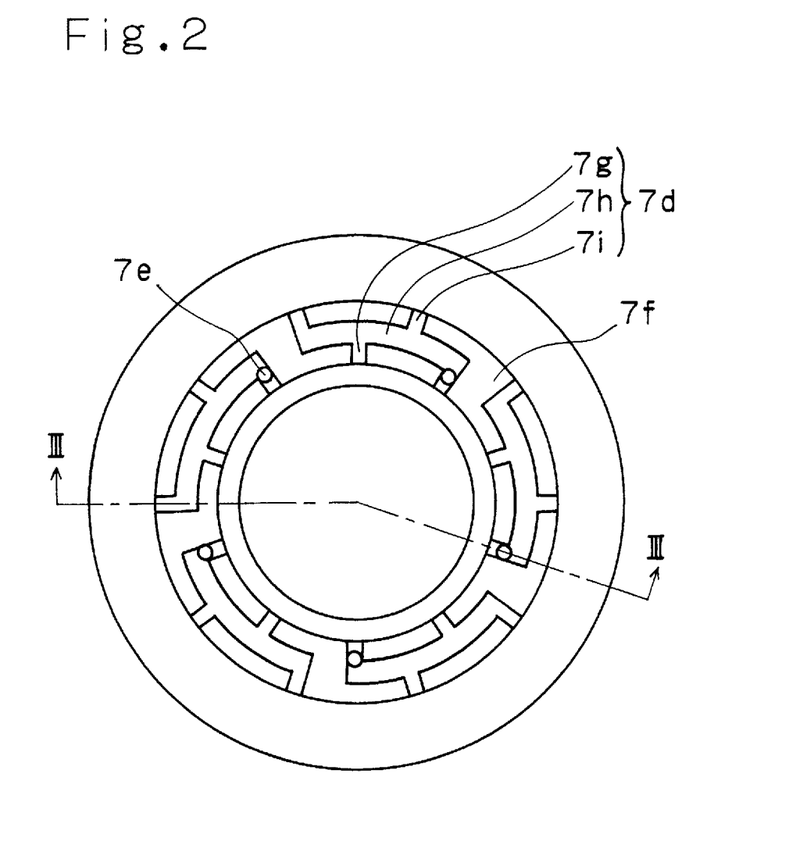
FIG. 2 is a plan view showing a stator carrier of the torque convertor depicted in FIG. 1.
Figure 3:
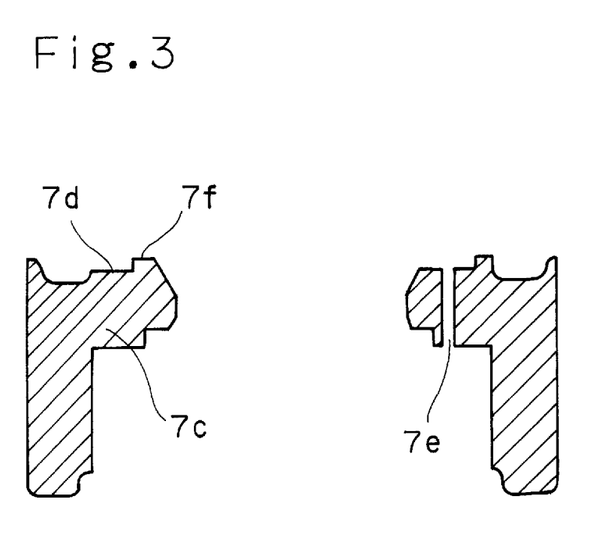
FIG. 3 is a cross-sectional view of a portion of the stator carrier, taken along line III—III in FIG. 2.

FIGS. 1, 2 and 3 show a torque convertor 1 in accordance with a first embodiment of the present invention. In the torque convertor 1, a working oil chamber is defined by a front cover 2 and an impeller shell 5a. The front cover 2 is configured such that it may be attached to an input member such as a flex plate on an engine (not shown). The impeller shell 5a is fixed to an outer circumferential wall 2a of the front cover 2 by, for instance, welding. Within the working oil chamber there are three kinds of tauruses and a lockup device 4.

The three tauruses include an impeller 5, a turbine 6 and a stator 7. Impeller blades 5b of the impeller 5 are fixed to an inner side of the impeller shell 5a. Also, an inner edge of the impeller shell 5a is fixed to an impeller hub 5c. The turbine 6 is disposed within the working oil chamber so as to face the impeller 5 and is mainly composed of a turbine shell 6a, and a plurality of turbine blades 6b fixed to the turbine shell 6a. An inner circumferential edge of the turbine shell 6a is fixed to a flange 8a of the turbine hub 8 by a plurality of rivets 9. Spline holes 8b are formed in the inner circumference of the turbine hub 8 for coupling with a main shaft (not shown) extending from a transmission (not shown).

The stator 7 is made of resin and is disposed between radially inward portions of the impeller 5 and the turbine 6 and is provided with an annular stator carrier 7a and a plurality of stator blades 7b. The stator 7 is configured to be supported by a stator shaft (not shown). The stator shaft (not shown) typically extends from a housing (not shown) of the transmission and extends into the torque convertor 1 such that a stator support 10 is supported on the stator shaft. The structure of the stator support 10 includes a one-way clutch mechanism (described below) and an annular retainer 12. The stator carrier 7a has thrust receiving portions 7c and oil introduction holes 7e in an inner circumferential portion thereof. The stator blades 7b are fixed to the stator carrier 7a for manipulating the direction of the flow of the working oil from the turbine 6 to the impeller 5. As shown in FIG. 2, the thrust receiving portion 7c has contact portions 7f and oil grooves 7d on one side surface. The contact portions 7f are in contact with the impeller hub 5c. Thus, the axial movement of the stator 7 toward the impeller 5 is limited. Each oil groove 7d is composed of a first groove portion 7g, a second groove portion 7h and a third groove portion 7i. The first groove portion 7g extends radially from the inner circumferential portion of the thrust receiving portion 7c. The second groove portion 7h extends circumferentially in the thrust receiving portion 7c. The third groove portion 7i extends radially outwardly in the thrust receiving portion 7c. The oil groove 7d allows the working oil to recirculate and at the same time restricts the flow of the working oil allowing it to lubricate. The oil introduction hole 7e supplies the one-way clutch mechanism with the working oil.

The one-way clutch mechanism is configured to allow rotation of the stator 7 only in one direction only. The one-way clutch mechanism includes an outer race 13, an inner race 15, and a clutch member 14 interposed between the two races. The outer race 13 is fixed to the inner circumference of the stator carrier 7a. Also, the sides of the outer race 13 and the inner race 15 toward the turbine 6 are in contact with the retainer 12, and the retainer 12 is supported on the turbine hub 8 through the thrust roller bearing 16. On the other hand, the sides of the outer race 13 and the inner race 15 toward the impeller 5 are in contact with the thrust receiving portion 7c of the stator 7, and the thrust receiving portion 7c is supported by the impeller hub 5c in one axial direction. Thus, the axial movement of the stator 7 and the structure of the stator support 10 is limited between the impeller hub 5c and the turbine hub 8 by a thrust roller bearing 16 and the thrust receiving porion 7c. Spline holes 15a are formed in the inner circumferential portion of the inner race 15 for engaging with the stator shaft (not shown).

The operation of the invention will now be described.

When the front cover 2 is rotated by the rotation of the engine, the impeller 5 also rotates. The rotational force from the impeller 5 is then transmitted to the turbine 6 through the movement of the working oil. The flow of the working oil from the turbine 6 side to the impeller 5 is directed by the stator 7 toward the impeller 5. Then, the rotational force of the turbine 6 is transmitted to the main drive shaft (not shown) of the transmission through the turbine hub 8.

During such an operation, a load (thrust load) is generated in the axial direction within the torque convertor 1 due to the flow of the working oil and other forces within the torque convertor 1. Since the stator 7 is supported against the thrust load between the impeller hub 5c and the turbine hub 8 through the thrust roller bearing 16 and the thrust receiving portion 7c, the relative axial movement between the stator 7 and the impeller 5 and between the stator 7 and the turbine 6 is limited. On the other hand, the stator 7 and the impeller 5 and the stator 7 and the turbine 6 rotate relative to each other. The stator 7 and the impeller 5 rotate relative to each other under the condition that the contact portion 7f of the thrust receiving portion 7c is in contact with the impeller hub 5c. In this case, the stator 7 is made of a resin material which has a low frictional coefficient. Further, the oil grooves 7d are provided for maintaining a flow of the working oil in the thrust receiving portion 7c. Consequently the amount of wear due to the friction between the contacting portions of the stator 7 and impeller hub 5c are suppressed. The amount of frictional wear is generally small enough to impart little or no affect on the service life of the torque convertor 1.

Thus, since the present invention includes the stator 7 having the contact portion 7f which retains the working oil and is in direct contact with the impeller hub 5c of the impeller 5, it is possible to dispense with bearings typically found between the impeller 5 and the stator 7 in prior art configurations. The present invention enables reduction of the manufacturing cost since such a prior art bearing is not necessary. Also, an axial dimension of the torque convertor 1 may be reduced, which leads to a miniaturization of the torque convertor 1. Furthermore, this contributes to a reduction in weight of the torque convertor 1.

SECOND EMBODIMENT

Figure 4:
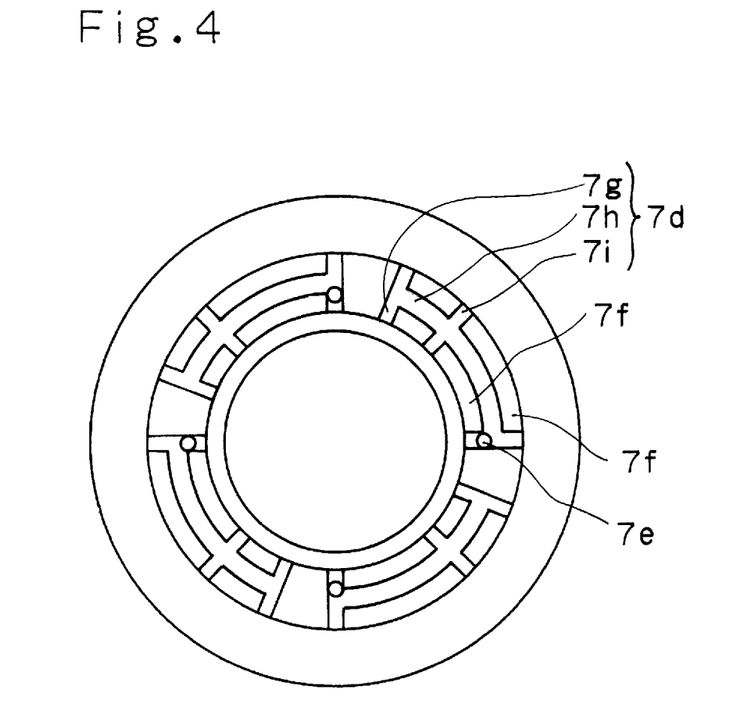
FIG. 4 is a plan view showing a stator carrier according to a second embodiment of the present invention.

The shapes of the contact portion 7f and the oil grooves 7d in the contact surface between the thrust receiving portion 7c of the stator 7 and the impeller hub 5c are not limited to that shown above in the first embodiment. In a second embodiment the contact portion 7f and the oil grooves 7d in the contact surface between the thrust receiving portion 7c of the stator 7 and the impeller hub 5c may be shaped as shown in FIG. 4. For instance, the first groove portion 7g in FIG. 4 extends entirely in a radial direction. The second groove portion 7h extends entirely in a circumferential direction. The third groove portion 7i extends in a radial direction from the second groove portion 7h. The configuration in FIG. 4 is designed to allow some fluid flow, but restrict the flow enough to provide lubrication for the contacting surfaces. The torque convertor 1 including the stator 7 with the contact surface with such shapes may constructed without a bearing typically employed in the prior art.

THIRD EMBODIMENT

Figure 5:
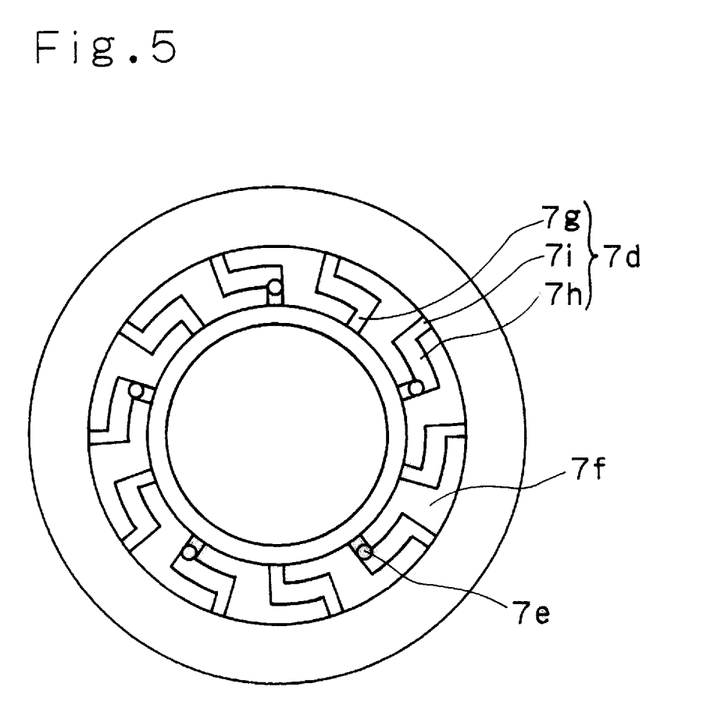
FIG. 5 is a plan view showing a stator carrier according to a third embodiment of the present invention.

The shapes of the contact portion 7f and the oil grooves 7d in the contact surface between the thrust receiving portion 7c of the stator 7 and the impeller hub 5c may be shaped as shown in FIG. 5. For instance, in FIG. 5, the first groove portion 7g and third groove portion 7i both extends in a radial direction and the second groove portion 7h extends in an axial direction between the first and third groove portions 7g and 7i.

FOURTH EMBODIMENT

Figure 6:
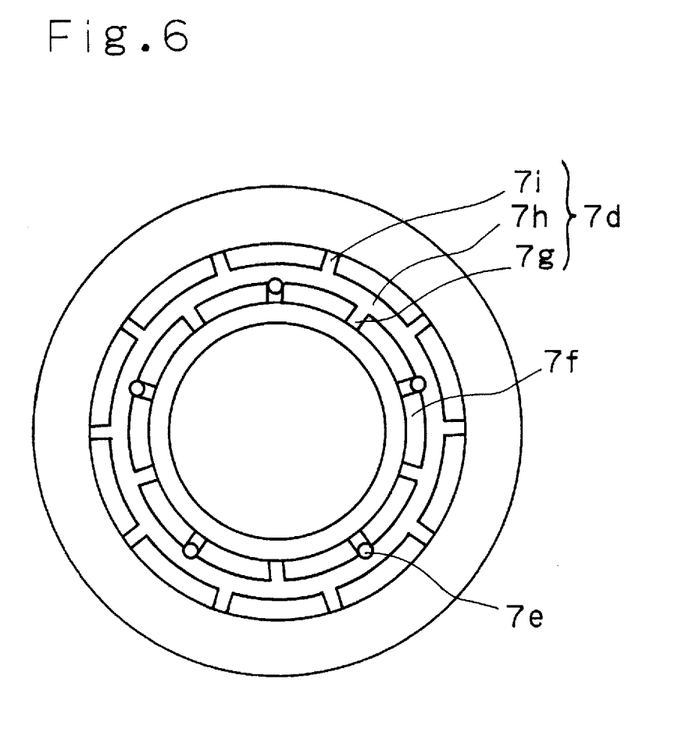
FIG. 6 is a plan view showing a stator carrier according to a fourth embodiment of the present invention.

The shapes of the contact portion 7f and the oil grooves 7d in the contact surface between the thrust receiving portion 7c of the stator 7 and the impeller hub 5c may also be formed as shown in FIG. 6. The first groove portion 7g in FIG. 6 extends in a radial direction. The second groove portion 7h extends in a circumferential direction forming an annular groove. The third groove portion 7i extends in a radial direction from the second groove portion 7h and is offset from the first groove portion 7g. The oil introduction holes 7e are formed in alternating first groove portions 7g.

FIFTH EMBODIMENT

Figure 7:
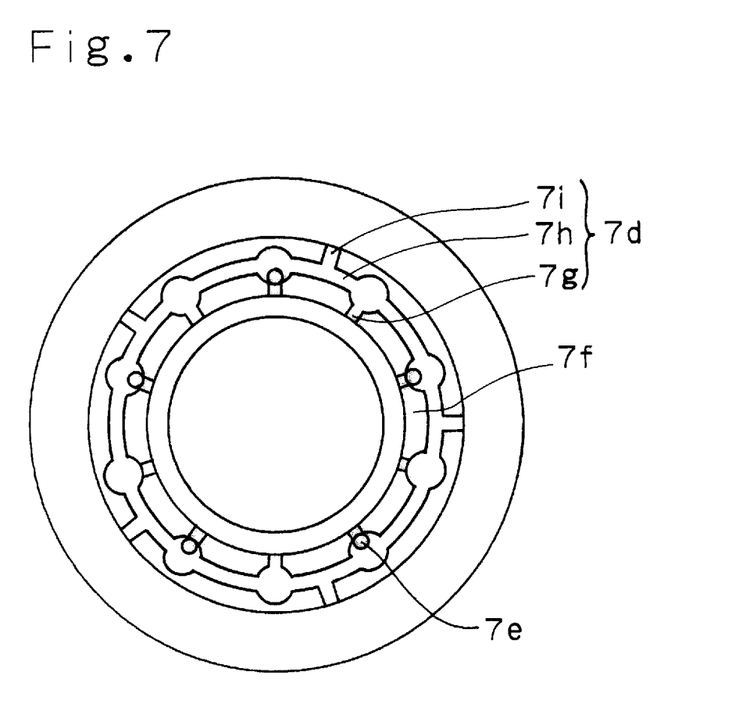
FIG. 7 is a plan view showing a stator carrier according to a fifth embodiment of the present invention.

The shapes of the contact portion 7f and the oil grooves 7d in the contact surface between the thrust receiving portion 7c of the stator 7 and the impeller hub 5c may further be formed as is shown in FIG. 7. The first groove portion 7g in FIG. 7 extends in a radial direction into a reservoir which is part of the second groove portion 7h. The second groove portion 7h extends in a circumferential direction forming an annular groove having a plurality of the reservoirs. The third groove portion 7i extends in a radial direction from the second groove portion 7h and is offset from the first groove portion 7g and offset from the reservoirs. The oil introduction holes 7e are formed in alternating first groove portions 7g opening into the reservoirs.

SIXTH EMBODIMENT

Figure 8:
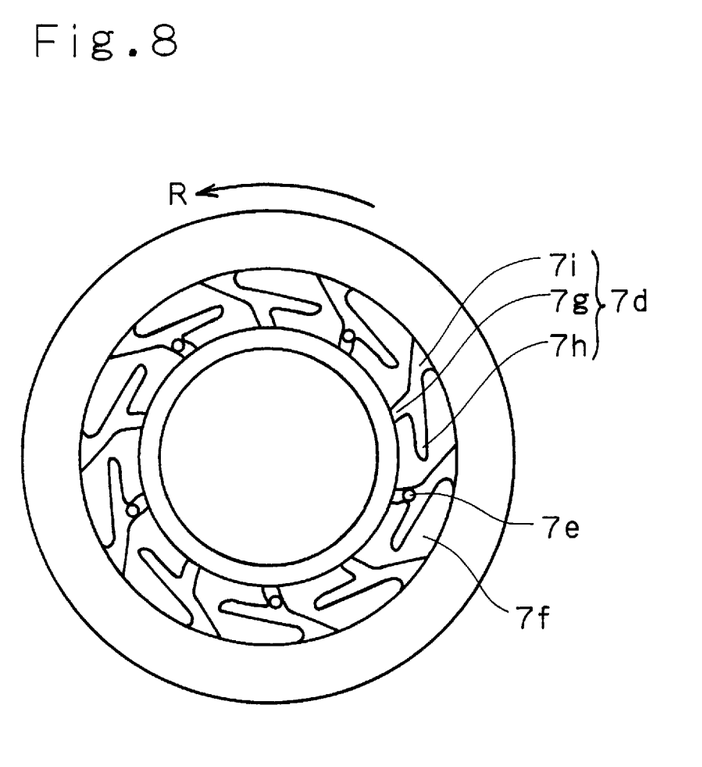
FIG. 8 is a plan view showing a stator carrier according to a sixth embodiment of the present invention.

The shapes of the contact portion 7f and the oil grooves 7d in the contact surface between the thrust receiving portion 7c of the stator 7 and the impeller hub 5c may be formed in those shown in FIG. 8. The oil grooves 7d are composed of first groove portions 7g, second groove portions 7h and third groove portions 7i. The first grooves portions 7g extend obliquely radially from the inner circumferential portion of the thrust receiving portion 7c and are in communication with one-sided ends of the second groove portions 7h. The second groove portions 7h are in communication at one-sided ends with the first groove portions 7g and the third groove portions 7i and extend in the circumferential portion of the thrust receiving portion 7c but the other-sided ends are formed into oil reservoir portions which are not in communication with other groove portions. The third groove portions 7i obliquely extends radially outwardly of the thrust receiving portions 7c from one-sided ends of the second groove portions 7h.

In this case, where the oil grooves 7d obliquely extend to be displaced in the circumferential direction from the inner circumferential portion of the thrust receiving portion 7c, the flow of the working oil may be made smooth. Also, the other-sided ends of the second groove portions 7h are out of communication with the other groove portions but may retain the working oil in the oil reservoir portions. The pressure in the working oil held in the second groove portions 7h is increased when the stator 7 and the impeller 5 are rotated relative to each other since the stator moves in the R direction relative to the impeller hub 5c. As a result, the friction generated in the contact surface between the contact portion 7f of the thrust receiving portion 7c and the impeller hub 5c may be reduced due to the presence of oil in the reservoir portions.

SEVENTH EMBODIMENT

Figure 9:
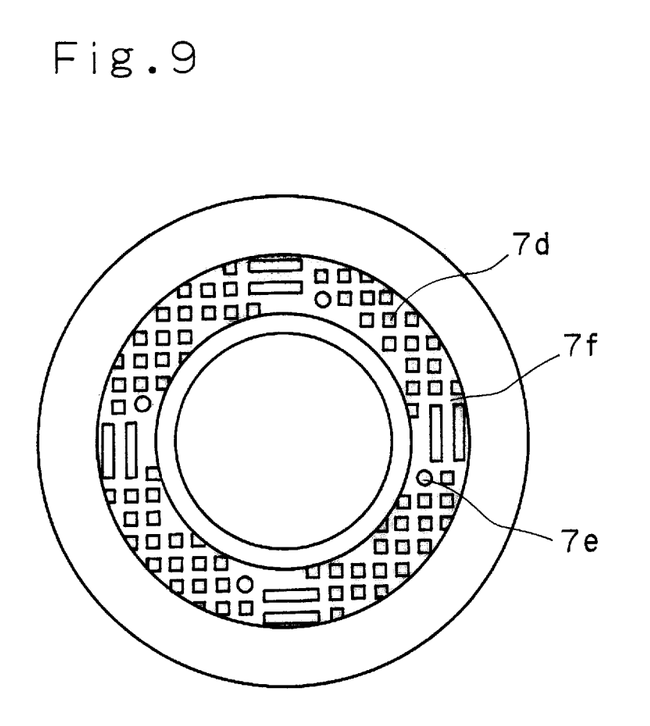
FIG. 9 is a plan view showing a stator carrier according to a seventh embodiment of the present invention.

The shapes of the contact portion 7f and the oil grooves 7d in the contact surface between the thrust receiving portion 7c of the stator 7 and the impeller hub 5c may also be formed as shown in FIG. 9 where the contact portions 7f are in the form of a plurality of small surface portions and the grooves 7d extend around the plurality of small surface portions.

EIGHTH EMBODIMENT

Figure 10:
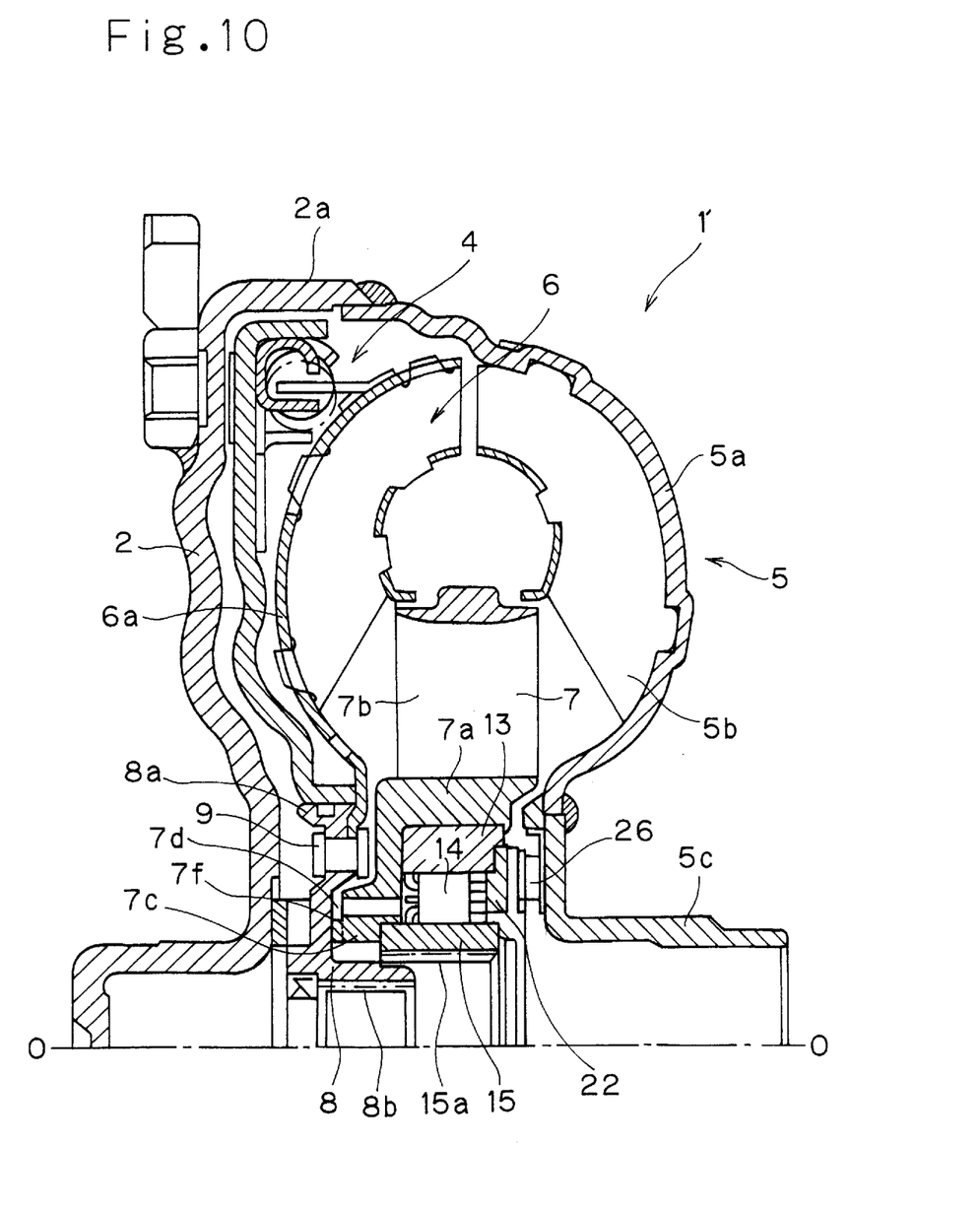
FIG. 10 is a cross-sectional view showing a torque convertor in accordance with eighth embodiment of the present invention.

As shown in FIG. 10, the configuration of the present invention may alternatively be such that a thrust roller bearing 26 is disposed between the impeller 5 and the stator 7. In the eighth embodiment, the turbine hub 8 of the turbine 6 and the thrust receiving portion 7c of the stator 7 contact with each other.

In the eighth embodiment shown in FIG. 10, the contact portion 7f is in contact with the turbine hub 8. Thus, the axial movement of the stator 7 toward the turbine 6 is limited. The side portions of the outer race 13 and the inner race 15, toward the impeller 5, of the one-way clutch mechanism are brought into contact with the retainer 22 which in turn is supported to the impeller hub 5c through the thrust roller bearing 26. On the other hand, the sides, toward the turbine 6, of the outer race 13 and the inner race 15 are in contact with the thrust receiving portion 7c of the stator 7, and the thrust receiving portion 7c is supported to the turbine hub 8. Thus, the axial movement of structure of the stator 7 and the stator support 10 is limited between the impeller hub 5c and the turbine hub 8 by the thrust roller bearing 26 and the thrust receiving portion 7c.

The other structural elements may be the same as those described with respect to the first embodiment. Further, the contact portion 7f and the oil grooves 7d may be as described with respect to FIGS. 2, 4, 5, 6, 7, 8 or 9.

During the operation of the torque convertor 1', the stator 7 and the turbine 6 are rotated relative to each other under the condition that the contact portion 7f of the thrust receiving portion 7c is in contact with the turbine hub 8. In this case, the stator 7 is made of a resin material and has a low frictional coefficient. The oil grooves 7d are provided for maintaining the working oil in the thrust receiving portion 7c. As a result, an amount of wear due to the friction from contact of the stator 7 and the turbine hub 8 may be suppressed. The amount of frictional wear may be small enough to impart little or no affect on the service life of the torque convertor 1'.

Thus, since the stator 7 having the contact portion 7f for holding the working oil is brought into direct contact with the turbine hub 8 of the turbine 6, it is possible to dispense with the bearing adopted conventionally between the turbine 6 and the stator 7. This enables reducing the manufacturing cost. Also, an axial dimension of the torque convertor 1 is reduced, which leads to a miniaturization of the torque convertor 1. Furthermore, this contributes to a reduction in weight of the torque convertor 1.

NINTH EMBODIMENT

In the foregoing embodiments, the thrust roller bearing 16 or 26 is adopted. It is however possible eliminate both the bearings 16 and 26 and utilize contact portions 7f between the impeller 5 and the stator 7 and between the turbine 6 and the stator 7.

In each of the embodiments above, the various oil grooves formed in the contact surfaces serve to provide lubrication to the contact surface so that a lubrication layer may be established between the contact surface and either the corresponding turbine or impeller surface.

In the torque convertor using the stator according to the present invention, it is possible to have the stator and the impeller or the turbine supported directly against one another in the axial direction without the use of a roller thrust bearing, and to suppress the generation of wear at the contact portion. It is therefore possible to maintain the service life of the torque convertor even if the thrust bearing is dispensed with. Thus, it is possible to reduce a manufacturing cost of the torque convertor, the weight thereof and the axial dimension thereof.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A torque convertor comprising;
    a stator body interposed between an impeller and a turbine in the torque convertor, said stator body formed with a thrust receiving portion provided on an inner circumferential portion of said stator body, said thrust receiving portion having a contact surface configured for direct contact with a portion of at least one of said impeller and said turbine such that axial movement of said stator body is limited by said thrust receiving portion; and
    said thrust receiving portion includes a plurality of oil grooves formed in said contact surface, said oil grooves for recirculating and retaining working oil.

2. The torque convertor according to claim 1, wherein said contact surface extends in a radial direction, said oil grooves include first groove portions extending radially from an inner circumferential edge of said contact surface, second groove portions extending in a circumferential direction in said contact surface, and third groove portions extending radially outwardly from said second groove portions toward an outer circumferential edge of said contact surface.

3. The torque convertor according to claim 2, wherein said first groove portions are circumferentially offset from said third groove portions.

4. The torque convertor according to claim 3, wherein first ends of said second groove portions include oil reservoir portions.

5. The torque convertor according to claims 1, wherein said stator body is formed with a one-way clutch receiving portion on an inner circumferential side, said one-way clutch receiving portion for receiving a one-way clutch, and said thrust receiving portion limits an axial movement of said one-way clutch.

6. The torque convertor according to claim 5, wherein said thrust receiving portion is formed with holes for communication between said one-way clutch receiving portion and said contact surface.

7. A torque convertor comprising:
a stator body interposed between an impeller and a turbine in the torque convertor, said stator body formed with a thrust receiving portion provided on an inner circumferential portion of said stator body, said thrust receiving portion having a contact surface configured for direct contact with a portion of said impeller such that axial movement of said stator body is limited by said thrust receiving portion; and
said thrust receiving portion includes a plurality of oil grooves formed in said contact surface, said oil grooves for recirculating and retaining working oil.

8. The torque convertor according to claim 7, wherein said contact surface extends in a radial direction, said oil grooves include first groove portions extending radially from an inner circumferential edge of said contact surface, second groove portions extending in a circumferential direction in said contact surface, and third groove portions extending radially outwardly from said second groove portions toward an outer circumferential edge of said contact surface.

9. The torque convertor according to claim 8, wherein said first groove portions are circumferentially offset from said third groove portions.

10. The torque convertor according to claim 9, wherein first ends of said second groove portions include oil reservoir portions.

11. The torque convertor according to claims 7, wherein said stator body is formed with a one-way clutch receiving portion on an inner circumferential side, said one-way clutch receiving portion for receiving a one-way clutch, and said thrust receiving portion limits an axial movement of said one-way clutch.

12. The torque convertor according to claim 11, wherein said thrust receiving portion is formed with holes for communication between said one-way clutch receiving portion and said contact surface.

13. A torque convertor , comprising:
a stator body interposed between an impeller and a turbine in the torque convertor, said stator body formed with a thrust receiving portion provided on an inner circumferential portion of said stator body, said thrust receiving portion having a contact surface configured for direct contact with a portion of said turbine such that axial movement of said stator body is limited by said thrust receiving portion; and
said thrust receiving portion includes a plurality of oil grooves formed in said contact surface, said oil grooves for recirculating and retaining working oil.

14. The torque convertor according to claim 13, wherein said contact surface extends in a radial direction, said oil grooves include first groove portions extending radially from an inner circumferential edge of said contact surface, second groove portions extending in a circumferential direction in said contact surface, and third groove portions extending radially outwardly from said second groove portions toward an outer circumferential edge of said contact surface.

15. The torque convertor according to claim 14, wherein said first groove portions are circumferentially offset from said third groove portions.

16. The torque convertor according to claim 15, wherein first ends of said second groove portions include oil reservoir portions.

17. The torque convertor according to claims 13, wherein said stator body is formed with a one-way clutch receiving portion on an inner circumferential side, said one-way clutch receiving portion for receiving a one-way clutch, and said thrust receiving portion limits an axial movement of said one-way clutch.

18. The torque convertor according to claim 17, wherein said thrust receiving portion is formed with holes for communication between said one-way clutch receiving portion and said contact surface.

19. A torque convertor comprising:
a stator body interposed between an impeller and a turbine in the torque convertor, said stator body formed with first and second thrust receiving portions provided on opposing axial ends of an inner circumferential portion of said stator body, said first and second thrust receiving portions each having a corresponding contact surface configured for direct contact with a portion of said impeller and said turbine, respectively, such that axial movement of said stator body is limited by said first and second thrust receiving portions; and
said first and second thrust receiving portions each include a plurality of oil grooves formed in said contact surface, said oil grooves for recirculating and retaining working oil.

20. The torque convertor according to claim 19, wherein each of said contact surfaces extends in a radial direction, said oil grooves include first groove portions extending radially from an inner circumferential edge of said contact surface, second groove portions extending in a circumferential direction in said contact surface, and third groove portions extending radially outwardly from said second groove portions toward an outer circumferential edge of said contact surface.

* * * * *